US012782967B2

(12) United States Patent
Inoue

(10) Patent No.: US 12,782,967 B2
(45) Date of Patent: Nov. 3, 2026

(54) MANAGEMENT SYSTEM OF WORK SITE AND MANAGEMENT METHOD OF WORK SITE

(71) Applicant: KOMATSU LTD., Tokyo (JP)

(72) Inventor: Ryohei Inoue, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 18/850,771

(22) PCT Filed: May 22, 2023

(86) PCT No.: PCT/JP2023/018887
§ 371 (c)(1),
(2) Date: Sep. 25, 2024

(87) PCT Pub. No.: WO2023/234092
PCT Pub. Date: Dec. 7, 2023

(65) Prior Publication Data

US 2025/0208629 A1 Jun. 26, 2025

(30) Foreign Application Priority Data

May 31, 2022 (JP) ................................ 2022-089005

(51) Int. Cl.
*G05D 1/648* (2024.01)
*E01H 3/02* (2006.01)
*G05D 105/05* (2024.01)
*G05D 107/90* (2024.01)

(52) U.S. Cl.
CPC ............... *G05D 1/648* (2024.01); *E01H 3/02* (2013.01); *G05D 2105/05* (2024.01); *G05D 2107/90* (2024.01)

(58) Field of Classification Search
None
See application file for complete search history.

(56) References Cited

U.S. PATENT DOCUMENTS

| | | | | |
|---|---|---|---|---|
| 11,089,440 | B1 * | 8/2021 | Sawahashi | H04W 4/42 |
| 2011/0160920 | A1 | 6/2011 | Orr et al. | |
| 2011/0266360 | A1 * | 11/2011 | Gudat | B05B 13/00 239/11 |

(Continued)

FOREIGN PATENT DOCUMENTS

| | | |
|---|---|---|
| JP | 2013-516558 A | 5/2013 |
| JP | 2014-65392 A | 4/2014 |

(Continued)

OTHER PUBLICATIONS

Machine translation of JP-2018060450-A (Year: 2025).*
(Continued)

*Primary Examiner* — Jennifer M Anda
(74) *Attorney, Agent, or Firm* — Spencer Fane LLP

(57) ABSTRACT

A management system of a work site includes a sprinkling data generation unit and an assignment unit. The sprinkling data generation unit is configured to generate sprinkling data indicating a sprinkling condition of a sprinkling vehicle at the work site. The assignment unit is configured to, when receiving a transport request of an operator, output a transport command for causing the sprinkling vehicle operating based on the sprinkling data to travel to a destination position.

11 Claims, 12 Drawing Sheets

(56) References Cited

U.S. PATENT DOCUMENTS

| | | | | |
|---|---|---|---|---|
| 2018/0182248 | A1* | 6/2018 | Kanai | G08G 1/207 |
| 2021/0339752 | A1* | 11/2021 | Uenoyama | H04W 4/46 |
| 2024/0298563 | A1* | 9/2024 | Homma | A01B 69/008 |
| 2024/0298627 | A1* | 9/2024 | Ota | A01M 7/0089 |

FOREIGN PATENT DOCUMENTS

| | | | | |
|---|---|---|---|---|
| JP | 2018-60450 | A | | 4/2018 |
| JP | 2018060450 | A | * | 4/2018 |
| JP | 2020-160911 | A | | 10/2020 |
| JP | 2021-174469 | A | | 11/2021 |

OTHER PUBLICATIONS

International Search Report for the corresponding international patent application No. PCT/JP2023/018887, issued on Jul. 4, 2023.
The Japanese Office Action drafted on Apr. 30, 2026 for the corresponding Japanese Application No. 2022-089005.

* cited by examiner

MANAGEMENT SYSTEM OF WORK SITE AND MANAGEMENT METHOD OF WORK SITE

CROSS-REFERENCE TO RELATED APPLICATIONS

This application is a U.S. National stage application of International Application No. PCT/JP2023/018887, filed on May 22, 2023. This U.S. National stage application claims priority under 35 U.S.C. § 119 (a) to Japanese Patent Application No. 2022-089005, filed in Japan on May 31, 2022, the entire contents of which are hereby incorporated herein by reference.

The present disclosure relates to a management system of a work site and a management method of a work site.

BACKGROUND

In a technical field related to a management system of a work site, a system as disclosed in JP 2013-516558 T is known.

SUMMARY

At the work site, a loading machine operated by an operator operates. The operator needs to travel between the loading machine and an office at a break time or a work shift timing. There is a demand for a technique that allows the operator to travel smoothly.

An object of the present disclosure is to smoothly perform traffic of an operator at a work site.

In order to achieve an aspect of the present invention, a management system of a work site, the management system comprises: a sprinkling data generation unit configured to generate sprinkling data indicating a sprinkling condition of a sprinkling vehicle at the work site; and an assignment unit configured to, when receiving a transport request of an operator, output a transport command for causing the sprinkling vehicle operating based on the sprinkling data to travel to a destination position.

According to the present disclosure, traffic of an operator at a work site is smoothly performed.

DESCRIPTION OF EMBODIMENTS

Hereinafter, embodiments according to the present disclosure will be described with reference to the drawings, but the present disclosure is not limited to the embodiments. Components of the embodiments described below can be appropriately combined. In addition, some components may not be used.

Work Site

Figure 1:
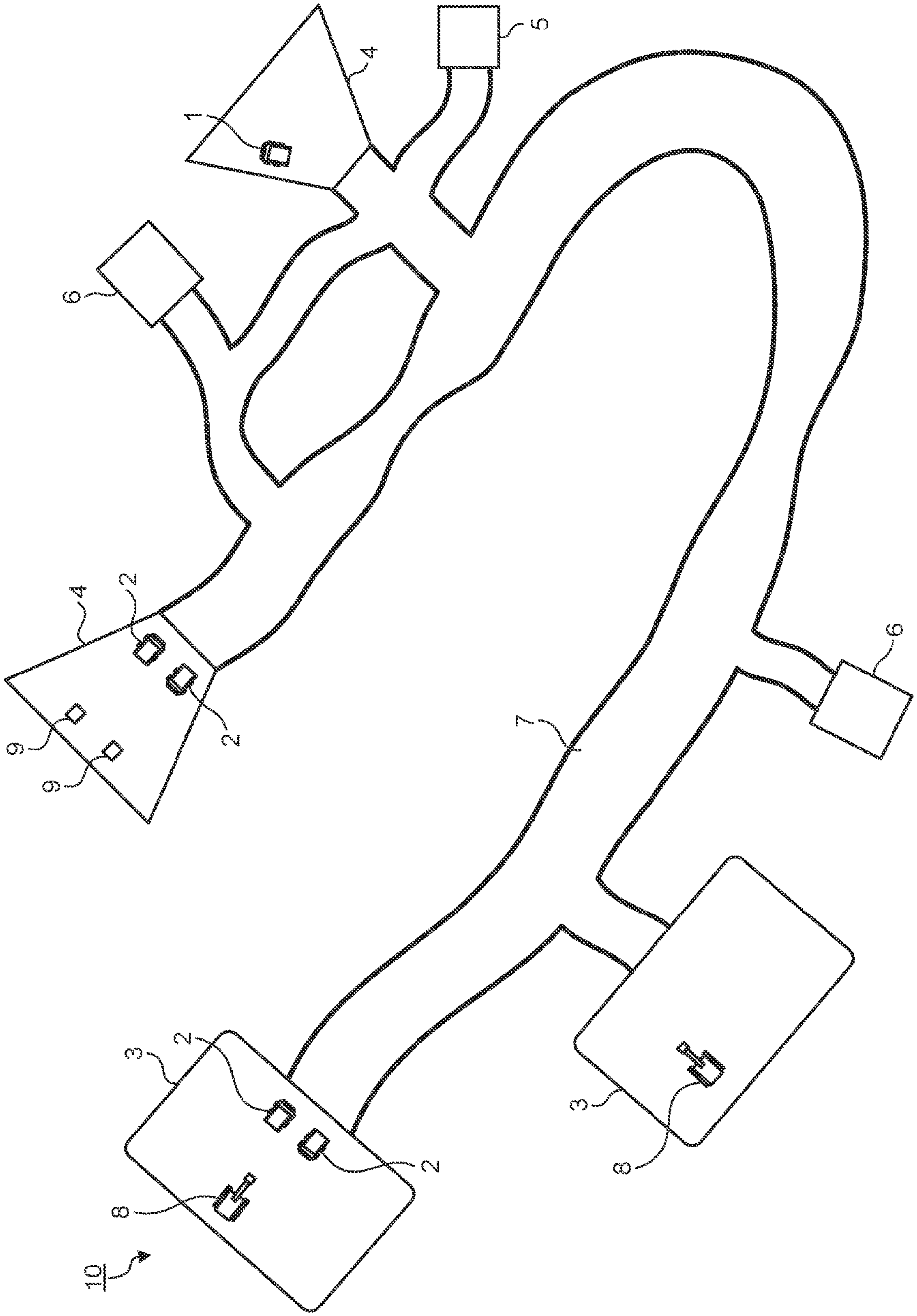
FIG. 1 is a schematic view illustrating a work site according to an embodiment.

FIG. 1 is a schematic view illustrating a work site 10 according to an embodiment. As the work site 10, a wide-area work site, such as a mine or a quarry, is exemplified. The mine refers to a place or a business site where minerals are mined. The quarry refers to a place or a business site where stones are mined. Examples of the mine include a metal mine for mining metal, a non-metal mine for mining limestone, and a coal mine for mining coal.

At the work site 10, a sprinkling vehicle 1, haul vehicles 2, and loading machines 8 operate.

The sprinkling vehicle 1 performs a sprinkling work of traveling and sprinkling through the work site 10. The sprinkling vehicle 1 sprinkles to suppress diffusion of dust or sand at the work site 10.

In the embodiment, the sprinkling vehicle 1 is an unmanned vehicle that operates in an unmanned manner without depending on a driving operation by a driver. When traveling through the work site 10, the driver does not get on the sprinkling vehicle 1. The sprinkling vehicle 1 travels through the work site 10 in an unmanned manner. Note that the driver may get on the sprinkling vehicle 1 when performing maintenance of the sprinkling vehicle 1 and other predetermined works.

The haul vehicle 2 travels through the work site 10 to perform a transportation work to transport a load. In the embodiment, the haul vehicle 2 is a dump truck.

In the embodiment, the haul vehicle 2 is an unmanned vehicle that operates in an unmanned manner without depending on a driving operation by a driver. When traveling through the work site 10, the driver does not get on the haul vehicle 2. The haul vehicle 2 travels through the work site 10 in an unmanned manner. The driver may get on the haul vehicle 2 when performing maintenance of the haul vehicle 2 and other predetermined works.

The loading machine 8 performs a loading work of loading a load on the haul vehicle 2. In the embodiment, the loading machine 8 is an excavator. In the following description, the loading machine 8 is appropriately referred to as an excavator 8.

In the embodiment, the excavator 8 is a manned vehicle operated by an operation by an operator. The operator gets on the excavator 8.

The work site 10 includes loading places 3, discharging places 4, a parking place 5, standby places 6, and a traveling road 7.

The loading place 3 refers to an area in which a loading work for loading a load on the haul vehicle 2 is performed. As the load, an excavated object excavated in the loading place 3 is exemplified. The excavator 8 operates in the loading place 3.

The discharging place 4 refers to an area where a discharging work for discharging a load from the haul vehicle 2 is performed. Crushers 9 are provided in the discharging place 4.

The parking place 5 refers to an area where the sprinkling vehicle 1 or the haul vehicle 2 is parked.

The standby place 6 refers to an area where an office exists. The office includes a standby facility and a rest facility of the operator.

The traveling road 7 refers to an area where at least one of the sprinkling vehicle 1 and the haul vehicle 2 travels. The traveling road 7 is provided so as to connect at least the loading place 3 and the discharging place 4. In the embodiment, the traveling road 7 is connected to each of the loading place 3, the discharging place 4, the parking place 5, and the standby place 6.

The sprinkling vehicle 1 can travel through each of the loading place 3, the discharging place 4, the parking place 5, the standby place 6, and the traveling road 7. The haul vehicle 2 can travel through each of the loading place 3, the discharging place 4, the parking place 5, and the traveling road 7. The haul vehicle 2 travels through the traveling road 7 so as to reciprocate between the loading place 3 and the discharging place 4, for example.

Management System

Figure 2:
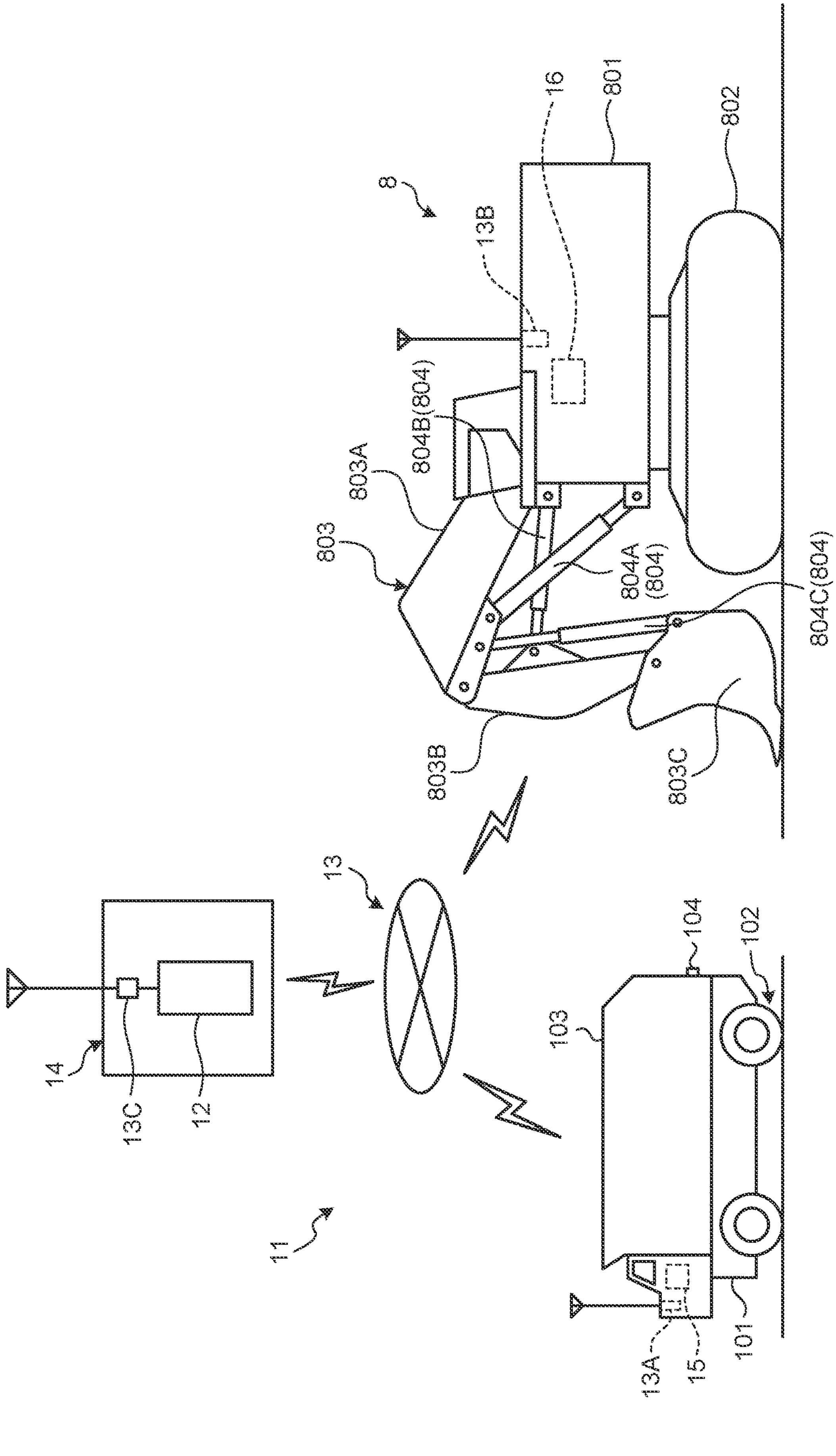
FIG. 2 is a schematic view illustrating a management system of the work site according to the embodiment.

FIG. 2 is a schematic view illustrating a management system 11 of the work site 10 according to the embodiment. The management system 11 includes a management device 12 and a communication system 13.

The management device 12 includes a computer system. The management device 12 is disposed outside the sprinkling vehicle 1, the haul vehicle 2, and the excavator 8. The management device 12 is installed in a control facility 14 of the work site 10. The management device 12 manages the work site 10. The management device 12 manages at least the sprinkling vehicle 1, the haul vehicle 2, and the excavator 8.

Examples of the communication system 13 include the Internet, a mobile phone communication network, a satellite communication network, or a local area network (LAN). Wi-Fi (registered trademark), which is one standard of wireless LAN, is exemplified as the local area network.

The sprinkling vehicle 1 has a vehicle body 101, a traveling device 102, a tank 103, a sprinkling spray 104, a control device 15, and a wireless communication device 13A. The control device 15 includes a computer system. The wireless communication device 13A is coupled to the control device 15.

The excavator 8 is operated by the operator. The excavator 8 has a swing body 801, a traveling device 802 that supports the swing body 801, working equipment 803 supported by the swing body 801, a working equipment cylinder 804 that operates the working equipment 803, a control device 16, and a wireless communication device 13B. The control device 16 includes a computer system. The wireless communication device 13B is coupled to the control device 16.

The communication system 13 includes the wireless communication device 13A coupled to the control device 15, the wireless communication device 13B coupled to the control device 16, and a wireless communication device 13C coupled to the management device 12. The management device 12 and the control device 15 of the sprinkling vehicle 1 perform wireless communication via the communication system 13. The management device 12 and the control device 16 of the excavator 8 perform wireless communication via the communication system 13.

The vehicle body 101 includes a vehicle body frame. The vehicle body 101 is supported by the traveling device 102. The traveling device 102 travels while supporting the vehicle body 101. The traveling device 102 includes wheels, tires mounted on the wheels, an engine, a brake device, and a steering device. The tank 103 is a member that stores water for sprinkling. At least a part of the tank 103 is disposed above the vehicle body 101. The sprinkling spray 104 sprays water in the tank 103. The sprinkling spray 104 is disposed at the rear of the tank 103. The sprinkling spray 104 sprinkles water to the rear of the sprinkling vehicle 1.

The swing body 801 swings while being supported by the traveling device 802. The traveling device 802 has a pair of crawler belts. The traveling device 802 allows the excavator 8 to move at the work site 10 including the loading place 3. The working equipment 803 includes a boom 803A rotatably connected to the swing body 801, an arm 803B rotatably connected to the boom 803A, and a bucket 803C rotatably connected to the arm 803B. The working equipment cylinder 804 is a hydraulic cylinder. The working equipment cylinder 804 includes a boom cylinder 804A that raises or lowers the boom 803A, an arm cylinder 804B that tilts or dumps the arm 803B, and a bucket cylinder 804C that tilts or dumps the bucket 803C.

Figure 3:
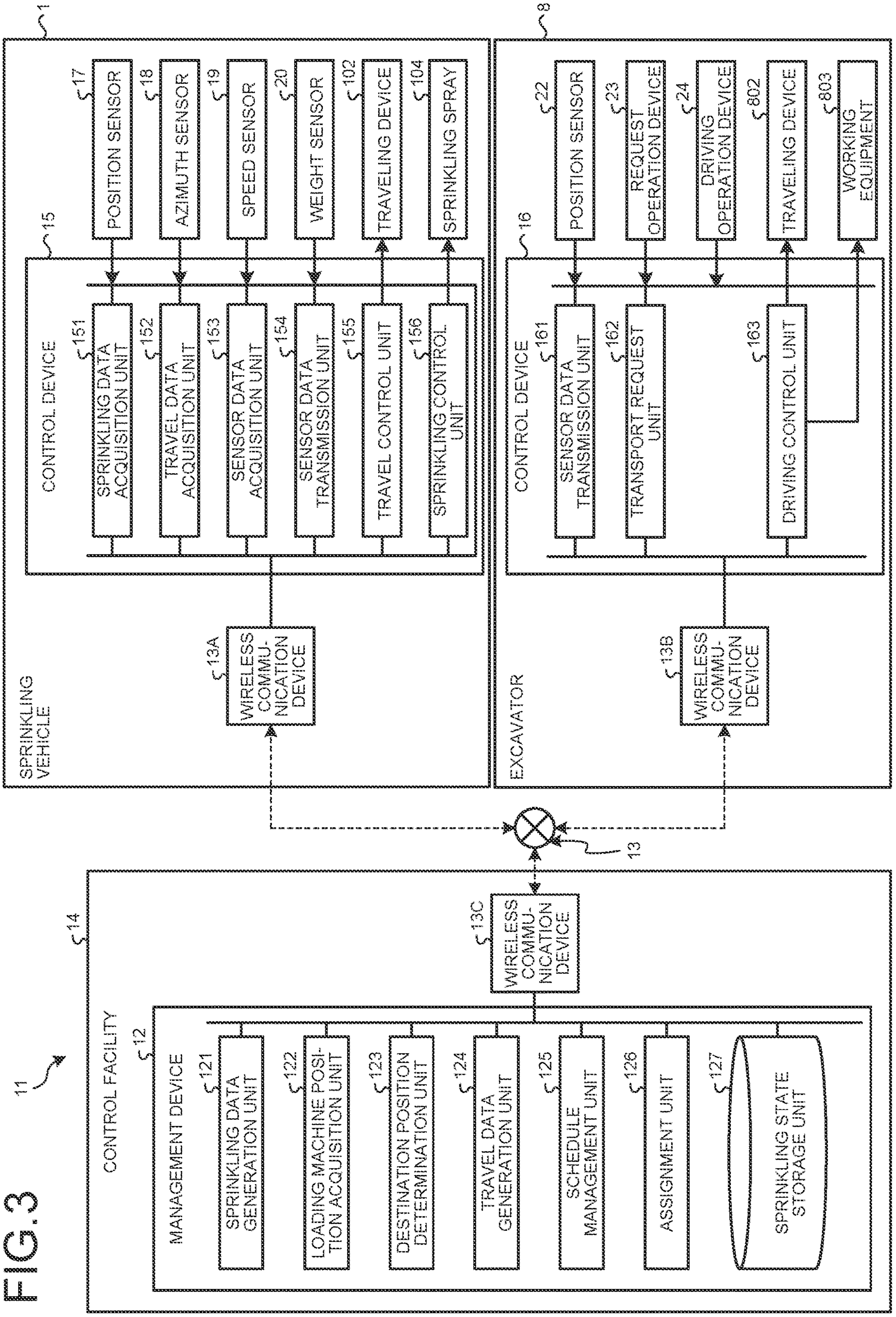
FIG. 3 is a block view illustrating the management system of the work site according to the embodiment.

FIG. 3 is a block view illustrating the management system 11 of the work site 10 according to the embodiment.

The sprinkling vehicle 1 has the control device 15, the wireless communication device 13A, a position sensor 17, an azimuth sensor 18, a speed sensor 19, a weight sensor 20, the traveling device 102, and the sprinkling spray 104. Each of the wireless communication device 13A, the position sensor 17, the azimuth sensor 18, the speed sensor 19, and the weight sensor 20 can communicate with the control device 15. Each of the traveling device 102 and the sprinkling spray 104 is controlled by the control device 15.

The position sensor 17 detects a position of the sprinkling vehicle 1. The position of the sprinkling vehicle 1 is detected using a global navigation satellite system (GNSS). The global navigation satellite system includes a global positioning system (GPS). The global navigation satellite system detects a position in a global coordinate system defined by coordinate data of latitude, longitude, and altitude. The global coordinate system refers to a coordinate system fixed to the earth. The position sensor 17 includes a GNSS receiver, and detects an absolute position of the sprinkling vehicle 1 indicating the position of the sprinkling vehicle 1 in the global coordinate system.

The azimuth sensor 18 detects an azimuth of the sprinkling vehicle 1. The azimuth of the sprinkling vehicle 1 includes a yaw angle of the sprinkling vehicle 1. When an axis extending in a vertical direction at a center of gravity of the vehicle body 101 is a yaw axis, the yaw angle refers to a rotation angle around the yaw axis. A gyro sensor is exemplified as the azimuth sensor 18.

The speed sensor 19 detects a travel speed of the sprinkling vehicle 1. As the speed sensor 19, a pulse sensor that detects a rotation of the wheels of the sprinkling vehicle 1 is exemplified.

The weight sensor 20 detects a weight (remaining amount) of water stored in the tank 103.

The excavator 8 has the control device 16, the wireless communication device 13B, a position sensor 22, a request operation device 23, a driving operation device 24, the traveling device 802, and the working equipment 803. Each of the wireless communication device 13B, the position sensor 22, the request operation device 23, and the driving operation device 24 can communicate with the control device 16.

The position sensor 22 detects a position of the excavator 8. The position sensor 22 includes a GNSS receiver and detects an absolute position of the excavator 8 indicating the position of the excavator 8 in the global coordinate system.

The request operation device 23 is operated by the operator when the operator makes a transport request. As the request operation device 23, a push button or a touch panel disposed inside the excavator 8 is exemplified. In addition, a mobile terminal supplied to the operator is exemplified as the request operation device 23. The transport request is a request signal transmitted by operating the device when the operator requests to move from a certain point (getting-on position) to another point (getting-off position), and includes at least a getting-on position of the operator.

The driving operation device 24 is operated by the operator when the traveling device 802 and the working equipment 803 are operated. The driving operation device 24 includes a travel lever operated for operating the traveling device 802 and a work lever operated for operating the working equipment 803.

The management device 12 has a sprinkling data generation unit 121, a loading machine position acquisition unit 122, a destination position determination unit 123, a travel data generation unit 124, a schedule management unit 125, an assignment unit 126, and a sprinkling state storage unit 127.

The sprinkling data generation unit 121 generates sprinkling data indicating a sprinkling condition of the sprinkling vehicle 1 at the work site 10. The sprinkling data includes performing and stopping sprinkling from the sprinkling spray 104. The sprinkling data includes an amount of water sprinkled from the sprinkling spray 104. In addition, the sprinkling data includes a sprinkling scheduled area where the sprinkling vehicle 1 sprinkles water at the work site 10. The sprinkling scheduled area refers to an area to be sprinkled from the sprinkling spray 104 of the sprinkling vehicle 1 at the work site 10.

The loading machine position acquisition unit 122 acquires a position of the excavator 8. As described above, the excavator 8 has the position sensor 22 that detects the position of the excavator 8. The loading machine position acquisition unit 122 acquires the position of the excavator 8 by acquiring detection data of the position sensor 22 via the communication system 13.

The destination position determination unit 123 determines a destination position of the sprinkling vehicle 1 based on the position of the excavator 8 acquired by the loading machine position acquisition unit 122. In the embodiment, the destination position is a getting-on position at which the operator gets on the sprinkling vehicle 1 or a getting-off position at which the operator gets off the sprinkling vehicle 1.

The travel data generation unit 124 generates travel data indicating a travel condition of the sprinkling vehicle 1 in the sprinkling work. The travel condition of the sprinkling vehicle 1 includes a sprinkling path indicating a target traveling route of the sprinkling vehicle 1. The travel data generation unit 124 generates the sprinkling path based on the sprinkling scheduled area. The travel data generation unit 124 generates the sprinkling path of the sprinkling vehicle 1 so that sprinkling is performed in the sprinkling scheduled area set by the sprinkling data generation unit 121. The travel data generation unit 124 transmits the travel data to the sprinkling vehicle 1 via the communication system 13.

The schedule management unit 125 manages a transport time of the operator.

The assignment unit 126 assigns a predetermined work to a plurality of sprinkling vehicles 1. At the work site 10, there are a plurality of sprinkling vehicles 1. The assignment unit 126 can assign a certain sprinkling vehicle 1 among the plurality of sprinkling vehicles 1 to a sprinkling work or assign a certain sprinkling vehicle 1 to a transport work of the operator. The assignment unit 126 can output a sprinkling command including at least one of start of sprinkling, continuation of sprinkling, interruption of sprinkling, and end of sprinkling of the sprinkling vehicle 1. When receiving a transport request of the operator, the assignment unit 126 can output a transport command for causing the sprinkling vehicle 1 operating based on the sprinkling data to travel to the destination position. The transport command includes at least a getting-on position (pick-up position) of the operator, and may further include a destination position (getting-off position) of the operator.

In the embodiment, when the transport request of the operator is received, the travel data generation unit 124 generates travel data in the transport work so that the sprinkling vehicle 1 allocated to the transport work travels to the destination position determined by the destination position determination unit 123.

The sprinkling state storage unit 127 collects and stores sprinkling state data from the plurality of sprinkling vehicles 1. The sprinkling state storage unit 127 stores a sprinkled area where sprinkling has already been performed at the work site 10 and an unsprinkled area where sprinkling has not yet been performed. In addition, the sprinkling state storage unit 127 stores a sprinkling time indicating a time when sprinkling has been performed.

The control device 15 has a sprinkling data acquisition unit 151, a travel data acquisition unit 152, a sensor data acquisition unit 153, a sensor data transmission unit 154, a travel control unit 155, and a sprinkling control unit 156.

The sprinkling data acquisition unit 151 acquires the sprinkling data of the sprinkling vehicle 1 generated by the sprinkling data generation unit 121 from the management device 12 via the communication system 13.

The travel data acquisition unit 152 acquires the travel data of the sprinkling vehicle 1 generated by the travel data generation unit 124 from the management device 12 via the communication system 13.

The sensor data acquisition unit 153 acquires detection data of the position sensor 17, detection data of the azimuth sensor 18, detection data of the speed sensor 19, and detection data of the weight sensor 20.

The sensor data transmission unit 154 transmits the detection data of the position sensor 17 and the detection data of the weight sensor 20 to the management device 12 via the communication system 13.

The travel control unit 155 controls the traveling device 102 based on the travel data of the sprinkling vehicle 1 acquired by the travel data acquisition unit 152 and the detection data acquired by the sensor data acquisition unit 153.

The sprinkling control unit 156 controls the sprinkling spray 104 based on the sprinkling data of the sprinkling vehicle 1 acquired by the sprinkling data acquisition unit 151.

The control device 16 has a sensor data transmission unit 161, a transport request unit 162, and a driving control unit 163.

The sensor data transmission unit 161 transmits the detection data of the position sensor 22 to the management device 12 via the communication system 13.

The transport request unit 162 transmits a transport request of the operator for the excavator 8 to the management device 12. The transport request unit 162 transmits operation data generated by operating the request operation device 23 to the management device 12 via the communication system 13, thereby transmitting the transport request to the management device 12.

The driving control unit 163 controls the traveling device 802 and the working equipment 803 based on the operation data generated by operating the driving operation device 24.

Figure 4:
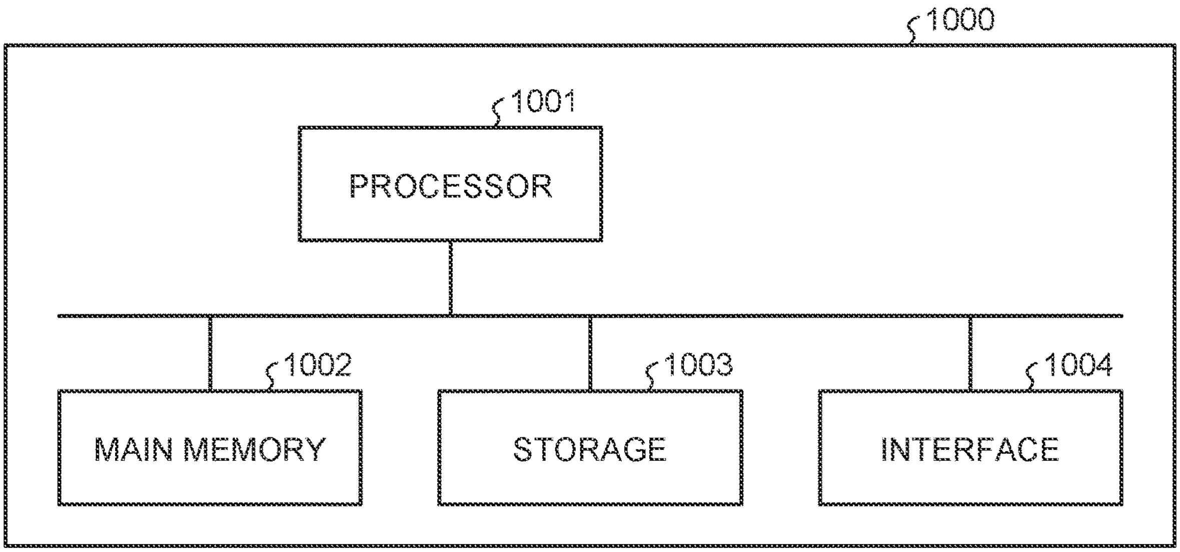
FIG. 4 is a hardware configuration view of a management device according to the embodiment.

FIG. 4 is a hardware configuration view of the management device 12 according to the embodiment. The management device 12 includes a computer system 1000. The computer system 1000 has a processor 1001, such as a central processing unit (CPU), a main memory 1002 including a nonvolatile memory, such as a read only memory (ROM), and a volatile memory, such as a random access memory (RAM), a storage 1003, and an interface 1004 including an input/output circuit. The functions of the management device 12 described above are stored in the storage 1003 as a computer program. The processor 1001 reads the computer program from the storage 1003, develops the computer program in the main memory 1002, and executes the above-described processing according to the program. Note that the computer program may be distributed to the computer system 1000 via a network.

Each of the control device 15 and the control device 16 includes the computer system 1000 as illustrated in FIG. 4. The functions of each of the control device 15 and the control device 16 described above are stored in the storage 1003 as a computer program.

Travel Data

Figure 5:
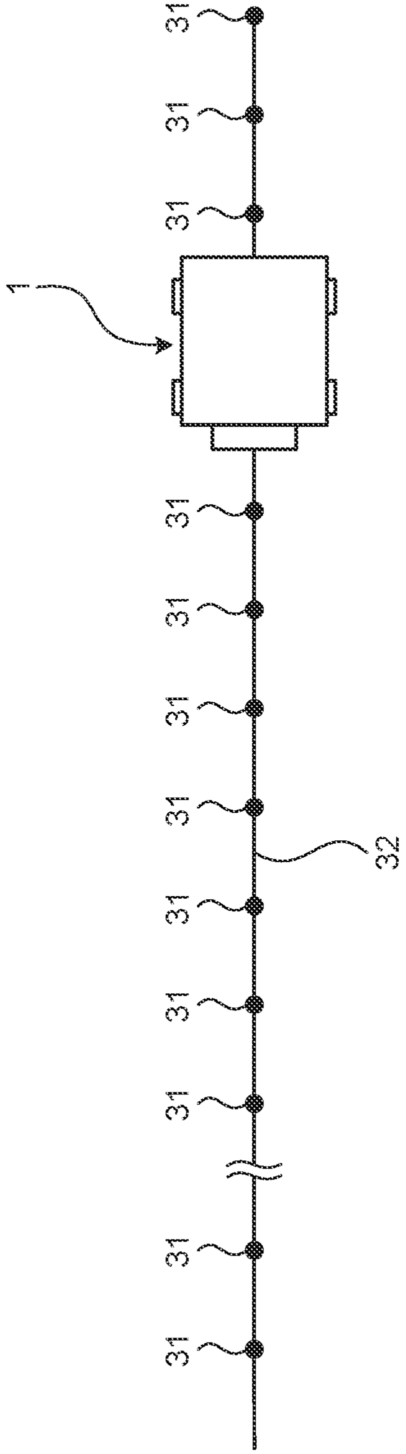
FIG. 5 is a schematic view for explaining travel data of a sprinkling vehicle according to the embodiment.

FIG. 5 is a schematic view for explaining the travel data of the sprinkling vehicle 1 according to the embodiment.

The travel data of the sprinkling vehicle 1 defines a travel condition of the sprinkling vehicle 1. The travel data of the sprinkling vehicle 1 includes travel points 31, a travel path 32, a target position of the sprinkling vehicle 1, a target azimuth of the sprinkling vehicle 1, and a target travel speed of the sprinkling vehicle 1. The travel data of the sprinkling vehicle 1 is generated by the travel data generation unit 124.

A plurality of travel points 31 are set at the work site 10. The travel point 31 defines the target position of the sprinkling vehicle 1. The target azimuth of the sprinkling vehicle 1 and the target travel speed of the sprinkling vehicle 1 are set for each of the plurality of travel points 31. The plurality of travel points 31 are set at intervals. The intervals between the travel points 31 may be uniform or non-uniform.

The travel path 32 refers to a virtual line indicating a target traveling route of the sprinkling vehicle 1. The travel path 32 is defined by a trajectory passing through the plurality of travel points 31. The sprinkling vehicle 1 travels through the work site 10 according to the travel path 32. The sprinkling vehicle 1 travels so that the center of the sprinkling vehicle 1 coincides with the travel path 32 in a vehicle width direction of the sprinkling vehicle 1.

The target position of the sprinkling vehicle 1 refers to a target position of the sprinkling vehicle 1 when passing through the travel point 31. The target position of the sprinkling vehicle 1 may be defined in a local coordinate system of the sprinkling vehicle 1 or may be defined in a global coordinate system.

The target azimuth of the sprinkling vehicle 1 refers to a target azimuth of the sprinkling vehicle 1 when passing through the travel point 31.

The target travel speed of the sprinkling vehicle 1 refers to a target travel speed of the sprinkling vehicle 1 when passing through the travel point 31.

The travel control unit 155 controls the traveling device 102 so that the sprinkling vehicle 1 travels along the travel path 32 based on the travel data of the sprinkling vehicle 1 and the detection data acquired by the sensor data acquisition unit 153.

The travel control unit 155 controls the traveling device 102 so as to reduce a deviation between a detected position of the sprinkling vehicle 1 detected by the position sensor 17 when passing through the travel point 31 and the target position of the sprinkling vehicle 1 set at the travel point 31.

The travel control unit 155 controls the traveling device 102 so as to reduce a deviation between a detected azimuth of the sprinkling vehicle 1 detected by the azimuth sensor 18 when passing through the travel point 31 and the target azimuth of the sprinkling vehicle 1 set at the travel point 31.

The travel control unit 155 controls the traveling device 102 so as to reduce a deviation between a detected travel speed of the sprinkling vehicle 1 detected by the speed sensor 19 when passing through the travel point 31 and the target travel speed of the sprinkling vehicle 1 set at the travel point 31.

First Embodiment of Transport Method: Transport Method from Excavator to Office

Figure 6:
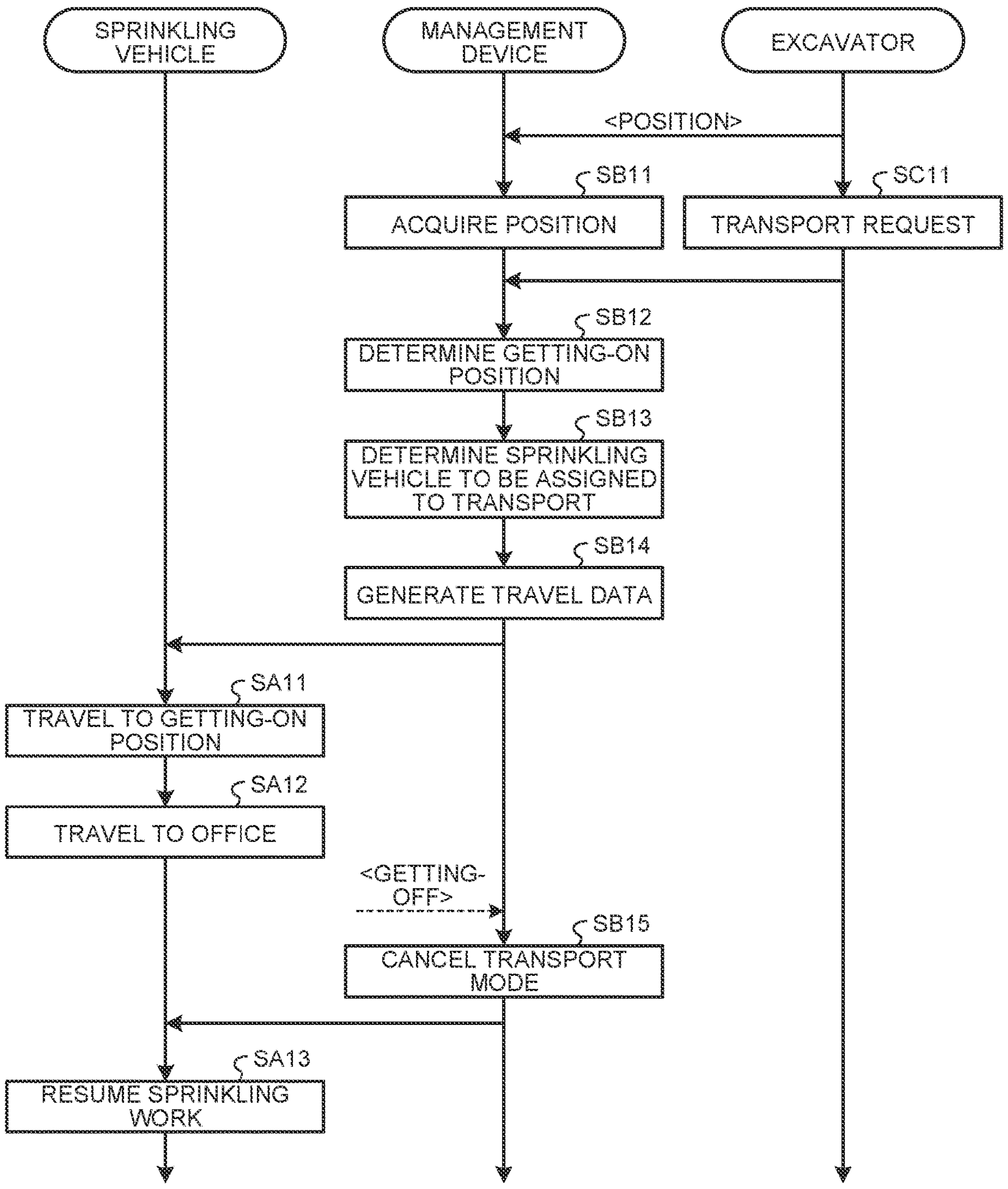
FIG. 6 is a flowchart illustrating a transport method from an excavator to an office according to the embodiment.
Figure 7:
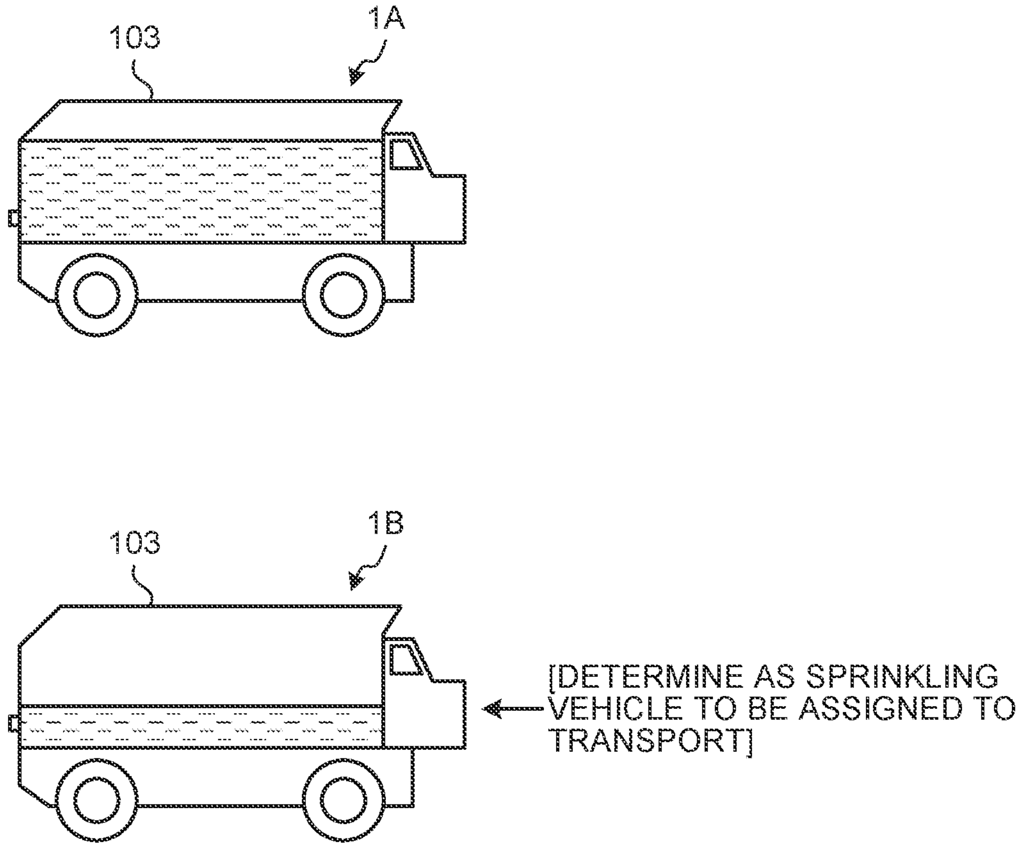
FIG. 7 is a schematic view for explaining the transport method from the excavator to the office according to the embodiment.
Figure 8:
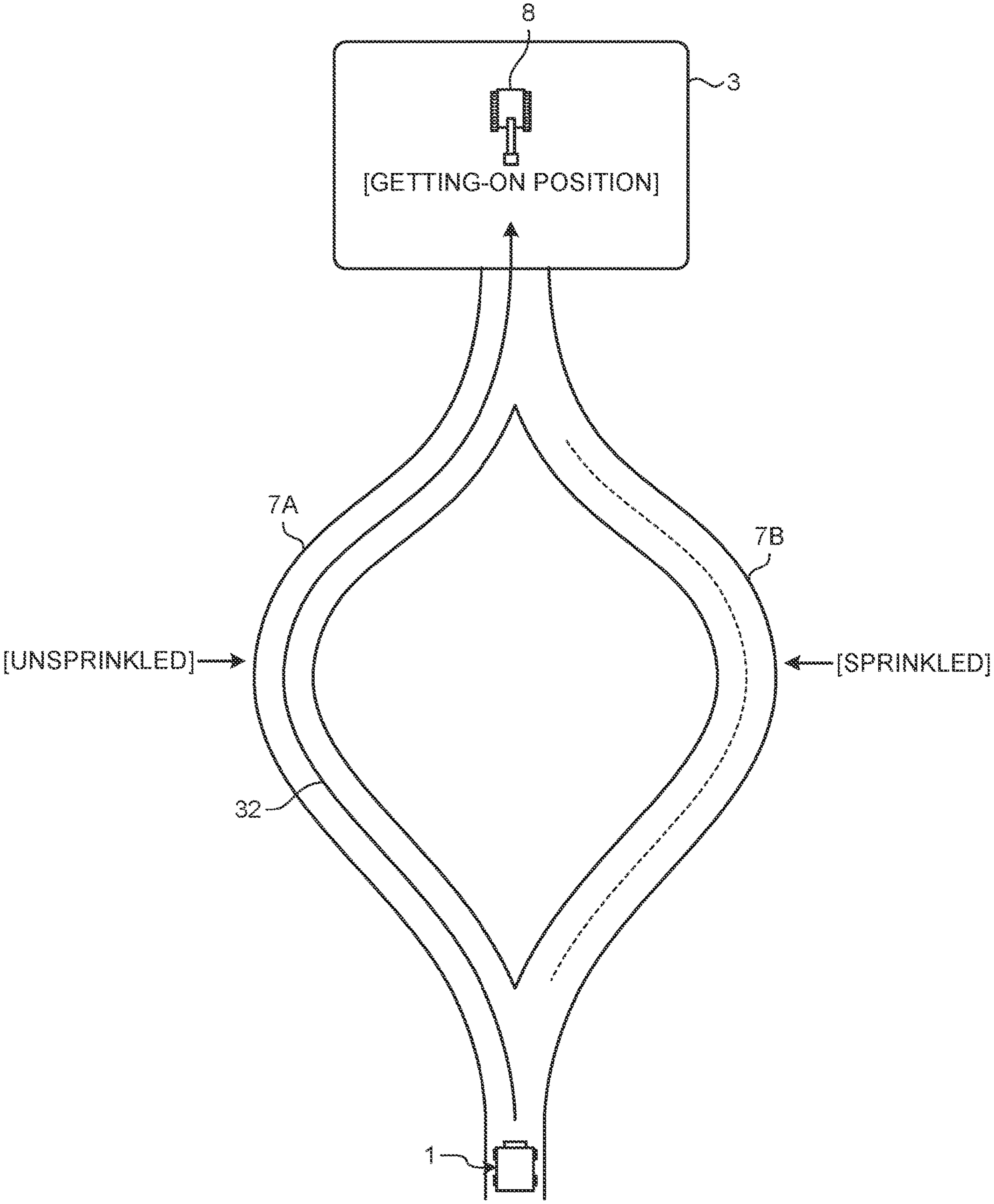
FIG. 8 is a schematic view for explaining the transport method from the excavator to the office according to the embodiment.
Figure 9:
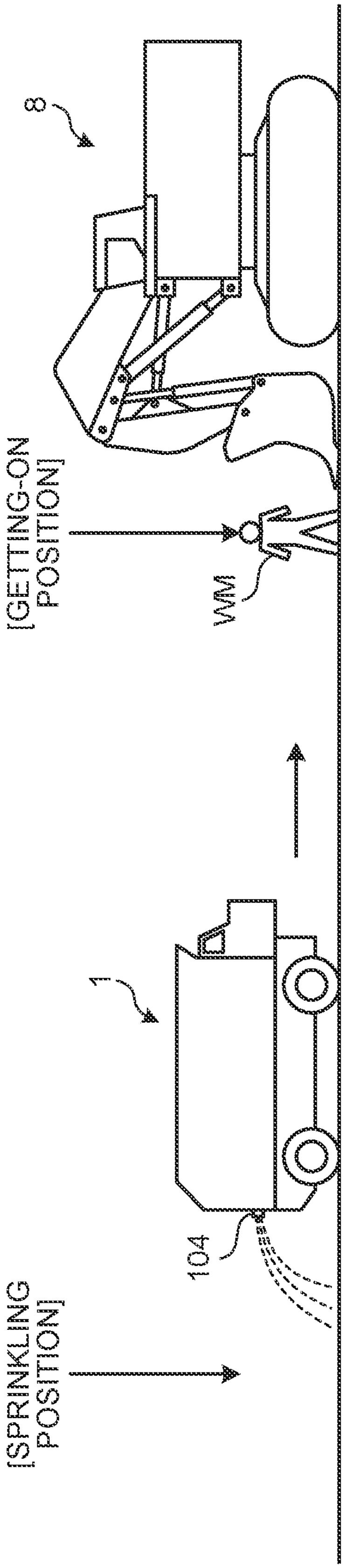
FIG. 9 is a schematic view for explaining the transport method from the excavator to the office according to the embodiment.

FIG. 6 is a flowchart illustrating a transport method from the excavator 8 to the office according to the embodiment. Each of FIGS. 7, 8, and 9 is a schematic view for explaining a transport method from the excavator 8 to the office according to the embodiment.

The office exists in the standby place 6. The office includes a standby facility and a rest facility of the operator. In the embodiment, a transport work when the sprinkling vehicle 1 is allocated to transportation of the operator from the excavator 8 to the office will be described.

For example, when taking a break or when working hours end, the operator of the excavator 8 operates the request operation device 23 disposed in the excavator 8 to move from the excavator 8 to the office (Step SC11).

The transport request unit 162 transmits a transport request to the management device 12 via the communication system 13 based on the operation data generated by operating the request operation device 23.

The sensor data transmission unit 161 constantly or periodically transmits detection data of the position sensor 22 indicating a position of the excavator 8 to the management device 12. The loading machine position acquisition unit 122 constantly or periodically acquires the position of the excavator 8 (Step SB11).

The destination position determination unit 123 receives the transport request transmitted from the transport request unit 162, and specifies the excavator 8 that has transmitted the transport request. The destination position determination unit 123 determines a destination position of the sprinkling vehicle 1 based on the position of the excavator 8 that has transmitted the transport request (Step SB12).

As illustrated in FIG. 9, the destination position is set in the vicinity of the excavator 8 that has transmitted the transport request. In the transport method according to the first embodiment, the destination position is a getting-on position (pick-up position) at which an operator WM who desires to move to the office gets on the sprinkling vehicle 1.

When receiving the transport request transmitted from the transport request unit 162, the assignment unit 126 determines a sprinkling vehicle 1 to be assigned to a transport work from a plurality of sprinkling vehicles 1 performing a sprinkling work based on the sprinkling data at the work site 10. In the embodiment, the sprinkling vehicle 1 assigned to the transport work means a sprinkling vehicle 1 to be caused to travel to the getting-on position determined in Step SB12 (Step SB13).

The sensor data transmission unit 154 constantly or periodically transmits detection data of the position sensor 17 indicating a position of the sprinkling vehicle 1 and detection data of the weight sensor 20 indicating a remaining amount of water stored in the tank 103 to the management device 12. The assignment unit 126 constantly or periodically acquires the position of the sprinkling vehicle 1 and the remaining amount of water in the tank 103.

The assignment unit 126 may determine the sprinkling vehicle 1 to be assigned to the transport work based on the position of each of the plurality of sprinkling vehicles 1. The assignment unit 126 may assign, for example, a sprinkling vehicle 1 existing at a position closest to the getting-on position among the plurality of sprinkling vehicles 1 to the transport work. By allocating the sprinkling vehicle 1 existing at the position closest to the getting-on position to the transport work, the sprinkling vehicle 1 can reach the getting-on position in a short time.

The assignment unit 126 may determine the sprinkling vehicle 1 to be assigned to the transport work based on the remaining amount of water stored in the tank 103 of each of the plurality of sprinkling vehicles 1. As illustrated in FIG. 7, the assignment unit 126 may assign a sprinkling vehicle 1 having the smallest remaining amount of water in the tank 103 among the plurality of sprinkling vehicles 1 to the transport work. By allocating a sprinkling vehicle 1 having a small remaining amount of water in the tank 103 to the transport work, the sprinkling vehicle 1 can reach the getting-on position with low fuel consumption. In addition, in a case where a water supply site for supplying water to the tank 103 exists near the office, the sprinkling vehicle 1 can receive water supply by traveling to the water supply site after transferring the operator WM to the office.

Based on the getting-on position determined in Step SB12, the travel data generation unit 124 generates travel data of the sprinkling vehicle 1 allocated to the transport work (Step SB14).

When the sprinkling vehicle 1 exists at the work site 10, the travel data generation unit 124 generates a travel path 32 so as to connect a current position and the getting-on position of the sprinkling vehicle 1.

The current position of the sprinkling vehicle 1 refers to a position of the sprinkling vehicle 1 at a time point when the destination position determination unit 123 receives the transport request. The sprinkling vehicle 1 performs a sprinkling work at the work site 10 based on the sprinkling data. The position of the sprinkling vehicle 1 is changed by the sprinkling work. The sprinkling data includes a sprinkling execution command for spraying water from the sprinkling spray 104 and a sprinkling stop command for stopping the spraying of water from the sprinkling spray 104. The sprinkling vehicle 1 may or may not spray water from the sprinkling spray 104 at the current position. In the embodiment, the sprinkling work includes spraying water from the sprinkling spray 104 and stopping spraying water from the sprinkling spray 104. That is, the current position is a position where the sprinkling vehicle 1 exists in the sprinkling work, and may be a position where sprinkling is performed or a position where sprinkling is stopped.

The travel data generation unit 124 transmits travel data including the travel path 32 to the sprinkling vehicle 1 assigned to the transport work by the assignment unit 126.

In the embodiment, the travel data generation unit 124 generates the travel data in the transport work based on the sprinkled area and the unsprinkled area stored in the sprinkling state storage unit 127. As illustrated in FIG. 8, in a case where there are a plurality of traveling roads 7 for the sprinkling vehicle 1 allocated to the transport work to go to the getting-on position, when a first traveling road 7A is an unsprinkled area and a second traveling road 7B is a sprinkled area, the travel data generation unit 124 may generate the travel data in the transport work so that the sprinkling vehicle 1 travels while sprinkling on the first traveling road 7A which is the unsprinkled area.

The assignment unit 126 outputs a transport command so that the sprinkling vehicle 1 to which the travel data of the transport work has been transmitted travels to the getting-on position.

The sprinkling vehicle 1 having received the travel data of the transport work shifts from a sprinkling mode to a transport mode after receiving the transport command. The sprinkling vehicle 1 travels from the current position to the destination position based on the travel data (Step SA11).

As illustrated in FIG. 9, the sprinkling vehicle 1 assigned to the transport work travels from the current position to the getting-on position while sprinkling water. After the sprinkling vehicle 1 arrives at the getting-on position, the operator WM gets on the sprinkling vehicle 1. After the operator WM gets on the sprinkling vehicle 1, the sprinkling vehicle 1 travels from the getting-on position to the office based on the travel data including the travel path 32 (Step SA12).

In the embodiment, the sprinkling vehicle 1 may be provided with a start switch operated by the operator WM. After the operator WM gets on the sprinkling vehicle 1, the sprinkling vehicle 1 starts from the getting-on position toward the office by operating the start switch. Note that in a case where the sprinkling vehicle 1 is provided with a human sensor, the sprinkling vehicle 1 may start from the getting-on position toward the office after determining that the operator WM has got on the sprinkling vehicle 1 based on the human sensor.

After the sprinkling vehicle 1 arrives at the office, the operator WM gets off the sprinkling vehicle 1. As a result, the operator WM can take a break at the office or go home from the office. After getting off the sprinkling vehicle 1, the operator WM transmits a getting-off notification indicating that the operator has got off the sprinkling vehicle 1 to the management device 12 using, for example, a mobile terminal. After receiving the getting-off notification, the assignment unit 126 transmits, to the sprinkling vehicle 1, a cancel command to cancel the transport mode of the sprinkling vehicle 1 that has been allocated to the transport work (Step SB15).

Upon receiving the cancel command, the sprinkling vehicle 1 shifts from the transport mode to the sprinkling mode. The sprinkling vehicle 1 resumes a sprinkling work from a traveling road 7 in the vicinity of the office based on the sprinkling data (Step SA13).

As described above, according to the transport method according to the first embodiment, the operator WM is transported from the excavator 8 to the office by the sprinkling vehicle 1. The getting-on position, which is the destination position of the sprinkling vehicle 1, is determined based on the position of the excavator 8. As a result, the sprinkling vehicle 1 can smoothly transport the operator WM of the excavator 8.

The sprinkling vehicle 1 performs a sprinkling work based on sprinkling data. The sprinkling vehicle 1 sprinkles water as necessary. For example, the sprinkling vehicle 1 sprinkles water on a dry ground and does not sprinkle water on a wet ground. For example, a sprinkling vehicle 1 that is stopping sprinkling is allocated to a transport work, whereby the sprinkling vehicle 1 is effectively used. In addition, as another example, a sprinkling vehicle 1 parked in the parking place 5 may be allocated to a transport work.

Modification of First Embodiment

In the above-described embodiment, a transport request is transmitted from the excavator 8 to the management device 12 by operating the request operation device 23 provided in the excavator 8. The transport request may be transmitted to the management device 12 by operating the mobile terminal provided to the operator WM.

In the above-described embodiment, a getting-off notification is transmitted to the management device 12 by operating the mobile terminal after the operator WM gets off the sprinkling vehicle 1. The getting-off notification may be transmitted to the management device 12 by operating a getting-off notification device provided in the office, or the getting-off notification may be transmitted to the management device 12 by the operator WM operating a device provided in the sprinkling vehicle 1 immediately before getting off the sprinkling vehicle 1.

Figure 10:
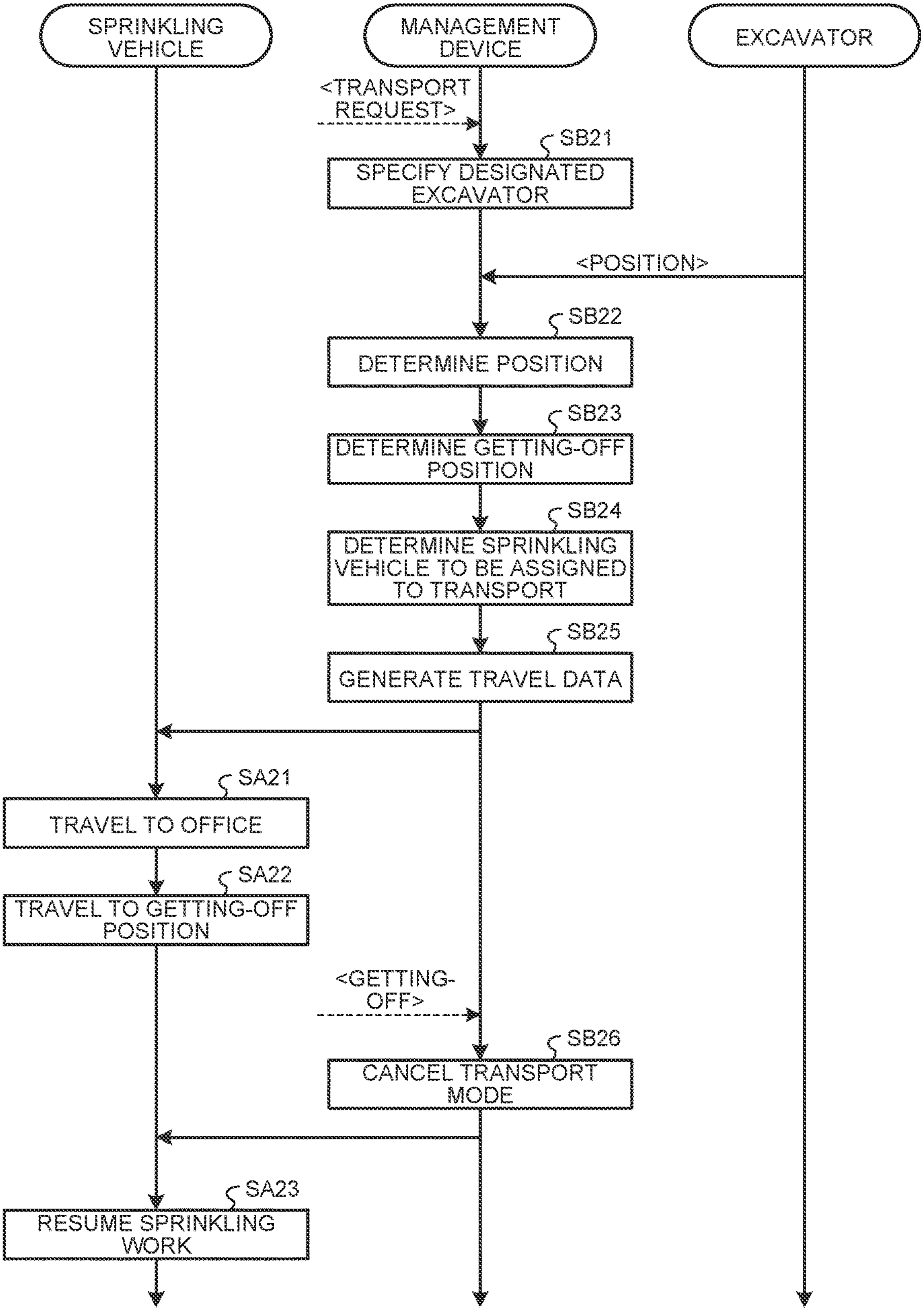
FIG. 10 is a flowchart illustrating a transport method from the office to the excavator according to the embodiment.
Figure 11:
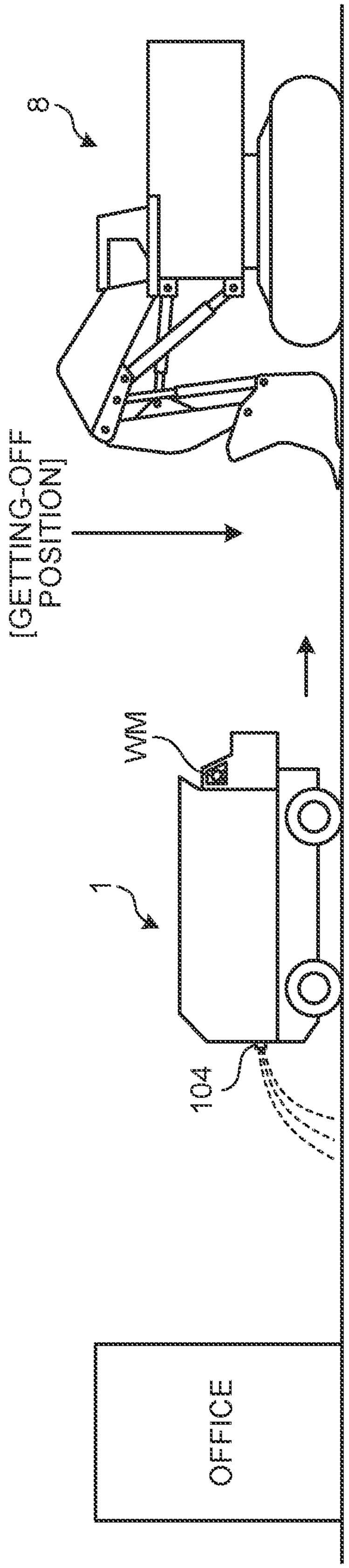
FIG. 11 is a schematic view for explaining the transport method from the office to the excavator according to the embodiment.

Second Embodiment of Transport Method: Transport Method from Office to Excavator FIG. 10 is a flowchart illustrating a transport method from the office to the excavator 8 according to the embodiment. FIG. 11 is a schematic view for explaining the transport method from the office to the excavator 8 according to the embodiment.

In the embodiment, the sprinkling vehicle 1 when the sprinkling vehicle 1 is allocated to transport of the operator WM from the office to the excavator 8 will be described.

For example, when a break ends or working hours start, the operator WM transmits a transport request to the management device 12 in order to move from the office to the excavator 8. The operator WM transmits the transport request to the management device 12 using, for example, the mobile terminal.

In the embodiment, the transport request includes designation data designating an excavator 8 that the operator WM desires to get on. The operator WM operates, for example, the mobile terminal to designate the excavator 8 desired to get on among a plurality of excavators 8 existing at the work site 10.

Note that a third party different from the operator WM may transmit the transport request to the management device 12. For example, a manager of the work site 10 may transmit the transport request to the management device 12.

The loading machine position acquisition unit 122 specifies the designated excavator 8 based on the transport request (Step SB21).

The loading machine position acquisition unit 122 constantly or periodically acquires a position of the excavator 8. The loading machine position acquisition unit 122 specifies the position of the excavator 8 specified in Step SB21 (Step SB22).

The destination position determination unit 123 determines a destination position of the sprinkling vehicle 1 based on the position of the excavator 8 specified in Step SB22 (Step SB23).

In the transport method according to a second embodiment, the destination position is a getting-off position at which the operator WM who desires to move to the excavator 8 gets off the sprinkling vehicle 1. As illustrated in FIG. 11, the getting-off position is set in the vicinity of the excavator 8 on which the operator WM desires to get on.

Upon receiving the transport request transmitted from the mobile terminal, the assignment unit 126 determines a sprinkling vehicle 1 to be allocated to the transport work from the plurality of sprinkling vehicles 1 existing at the work site 10 (Step SB24).

The assignment unit 126 may determine the sprinkling vehicle 1 to be assigned to the transport work based on a position of each of the plurality of sprinkling vehicles 1, or may determine the sprinkling vehicle 1 to be assigned to the transport work based on a remaining amount of water stored in the tank 103 of each of the plurality of sprinkling vehicles 1.

The travel data generation unit 124 generates travel data of the sprinkling vehicle 1 allocated to the transport work based on the getting-off position determined in Step SB22 (Step SB25).

When the sprinkling vehicle 1 exists at the work site 10, the travel data generation unit 124 generates a travel path 32 so as to connect a current position of the sprinkling vehicle 1 and the office. In addition, the travel data generation unit 124 generates the travel path 32 so as to connect the office and the getting-off position.

The travel data generation unit 124 transmits travel data including the travel path 32 to the sprinkling vehicle 1 assigned to the transport work by the assignment unit 126.

The assignment unit 126 outputs a transport command so that the sprinkling vehicle 1 to which the travel data of the transport work has been transmitted travels to the office.

The sprinkling vehicle 1 having received the travel data of the transport work shifts from a sprinkling mode to a transport mode after receiving the transport command. The sprinkling vehicle 1 travels from the current position to the office based on the travel data (Step SA21).

After the sprinkling vehicle 1 arrives at the office, the operator WM gets on the sprinkling vehicle 1. After the operator WM gets on the sprinkling vehicle 1, the sprinkling vehicle 1 travels from the office to the getting-off position based on the travel data (Step SA22).

In the embodiment, the sprinkling vehicle 1 may be provided with a start switch operated by the operator WM. After the operator WM gets on the sprinkling vehicle 1, the sprinkling vehicle 1 starts from the office toward the getting-off position by operating the start switch. Note that in a case where the sprinkling vehicle 1 is provided with a human sensor, the sprinkling vehicle 1 may start from the office toward the getting-off position after determining that the operator WM has got on the sprinkling vehicle 1 based on the human sensor.

After the sprinkling vehicle 1 arrives at the getting-off position, the operator WM gets off the sprinkling vehicle 1. As a result, the operator WM can get on the excavator 8. After getting off the sprinkling vehicle 1, the operator WM transmits a getting-off notification indicating that the operator has got off the sprinkling vehicle 1 to the management device 12 using, for example, a mobile terminal. After receiving the getting-off notification, the assignment unit 126 transmits, to the sprinkling vehicle 1, a cancel command to cancel the transport mode of the sprinkling vehicle 1 that has been allocated to the transport work (Step SB26).

Note that when the operator WM gets off the sprinkling vehicle 1, the getting-off notification may be transmitted to the management device 12 by operating the getting-off notification device provided in the excavator 8.

Upon receiving the cancel command, the sprinkling vehicle 1 shifts from the transport mode to the sprinkling mode. The sprinkling vehicle 1 resumes a sprinkling work from a traveling road 7 in the vicinity of the getting-off position based on the sprinkling data (Step SA23).

As described above, also in the embodiment, the sprinkling vehicle 1 can smoothly transport the operator WM of the excavator 8.

Third Embodiment of Transport Method: Transport Method by Schedule

Figure 12:
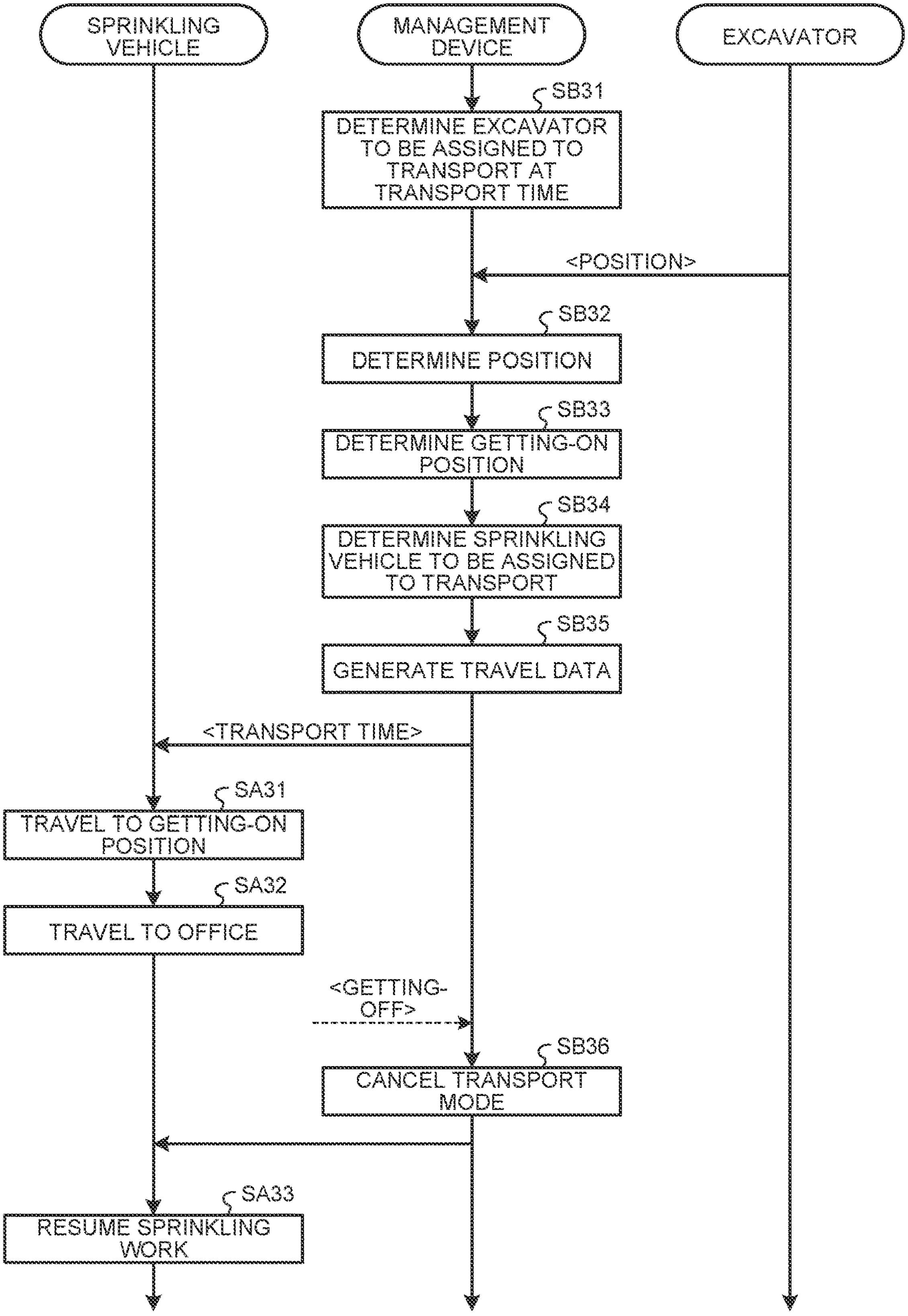
FIG. 12 is a flowchart illustrating a transport method according to a schedule according to the embodiment.

FIG. 12 is a flowchart illustrating a transport method according to a schedule according to the embodiment. In the embodiment, the assignment unit 126 assigns a sprinkling vehicle 1 to a transport work not based on a transport request but based on a transport time managed by the schedule management unit 125. In the embodiment, a transport work when the sprinkling vehicle 1 is allocated to transport of the operator WM from the excavator 8 to the office will be described.

The schedule management unit 125 manages a transport time of the operator WM by the sprinkling vehicle 1. The schedule management unit 125 specifies an excavator 8 to go to pick up the operator WM at the transport time (Step SB31).

The loading machine position acquisition unit 122 specifies a position of the excavator 8 specified by the schedule management unit 125 (Step SB32).

The destination position determination unit 123 determines a destination position of the sprinkling vehicle 1 based on the specified position of the excavator 8 (Step SB33).

In the transport method according to the third embodiment, the destination position is a getting-on position of the operator WM who desires to move to the office.

At the transport time, the assignment unit 126 determines the sprinkling vehicle 1 to be assigned to the transport work from a plurality of sprinkling vehicles 1 performing a sprinkling work based on the sprinkling data at the work site 10 (Step SB34).

The assignment unit 126 may determine the sprinkling vehicle 1 to be assigned to the transport work based on a position of each of the plurality of sprinkling vehicles 1, or may determine the sprinkling vehicle 1 to be assigned to the transport work based on a remaining amount of water stored in the tank 103 of each of the plurality of sprinkling vehicles 1.

Based on the getting-on position determined in Step SB33, the travel data generation unit 124 generates travel data of the sprinkling vehicle 1 allocated to the transport work (Step SB35).

The travel data generation unit 124 transmits travel data including the travel path 32 to the sprinkling vehicle 1 assigned to the transport work by the assignment unit 126.

The assignment unit 126 outputs a transport command so that the sprinkling vehicle 1 to which the travel data of the transport work has been transmitted travels to the getting-on position at the transport time.

The sprinkling vehicle 1 having received the travel data of the transport work shifts from a sprinkling mode to a transport mode after receiving the transport command. The sprinkling vehicle 1 travels from the current position to the getting-on position based on the travel data (Step SA31).

After the sprinkling vehicle 1 arrives at the getting-on position, the operator WM gets on the sprinkling vehicle 1. After the operator WM gets on the sprinkling vehicle 1, the sprinkling vehicle 1 travels from the getting-on position to the office based on the travel data including the travel path 32 (Step SA32).

After the sprinkling vehicle 1 arrives at the office, the operator WM gets off the sprinkling vehicle 1. As a result, the operator WM can take a break at the office or go home from the office. After getting off the sprinkling vehicle 1, the operator WM transmits a getting-off notification indicating that the operator has got off the sprinkling vehicle 1 to the management device 12 using, for example, a mobile terminal. After receiving the getting-off notification, the assignment unit 126 transmits, to the sprinkling vehicle 1, a cancel command to cancel the transport mode of the sprinkling vehicle 1 that has been allocated to the transport work (Step SB36).

Upon receiving the cancel command, the sprinkling vehicle 1 shifts from the transport mode to the sprinkling mode. The sprinkling vehicle 1 resumes a sprinkling work from a traveling road 7 in the vicinity of the office based on the sprinkling data (Step SA33).

An example in which the sprinkling vehicle 1 transports the operator WM from the excavator 8 to the office based on the transport time managed by the schedule management unit 125 has been described above. The sprinkling vehicle 1 may transport the operator WM from the office to the excavator 8 based on the transport time managed by the schedule management unit 125.

Effects

As described above, also in the embodiment, the sprinkling vehicle 1 can smoothly transport the operator WM of the excavator 8.

OTHER EMBODIMENTS

In the above-described embodiments, at a time point when the management device 12 receives a transport request from an operator, a destination position (getting-on position and getting-off position) at which the sprinkling vehicle 1 is caused to travel is instructed to the sprinkling vehicle 1. After the operator gets on the sprinkling vehicle 1, the getting-off position may be instructed via the control device 14 of the sprinkling vehicle 1, or the getting-off position may be instructed by operating the mobile terminal.

In the above-described embodiments, the sprinkling vehicle 1 may travel to replace an operator. For example, in a case where a transport request is output from the office, the sprinkling vehicle 1 first goes to the office and causes an operator of a next shift to get on. Thereafter, the vehicle is caused to travel to the vicinity of the excavator 8 which is a destination position, and after the operator is caused to get off, an operator of a previous shift is caused to get on the vehicle. It may be a process of causing the vehicle to travel again toward the office, which is a next destination position, and causing the operator of the previous shift to get off at the office.

In the above-described embodiments, the sprinkling vehicle 1 transports an operator between the excavator 8 and the office. The sprinkling vehicle 1 may transport the operator between any two points of the work site 10. For example, the sprinkling vehicle 1 may transport the operator between the office and the parking place 5, or may transport the operator between a first excavator and a second excavator. Furthermore, an arbitrary point may be designated as the getting-on position, and an arbitrary point may be designated as the getting-off position.

In the above-described embodiments, the sprinkling vehicle 1 is an unmanned vehicle. The sprinkling vehicle 1 may be a manned vehicle. When the sprinkling vehicle 1 is a manned vehicle, a transport command may be output to a driver of the manned vehicle.

In the above-described embodiments, a target of the destination position (getting-on position or getting-off position) is the excavator 8. The target of the destination position may be a bulldozer, a wheel loader, or another work machine.

The invention claimed is:

1. A management system of a work site, the management system comprising:

a processor, the processor being configured to:

generate sprinkling data indicating a sprinkling condition of a sprinkling vehicle operating in an unmanned manner at the work site;

receive position data of a plurality of the sprinkling vehicles existing at the work site;

receive a transport request based on an operation of a request operating device arranged in a manned loading machine that is boarded and an operator, among a plurality of loading machines existing at the work site;

identify, based on the transport request, the manned loading machine that has transmitted the transport request;

set, based on position data from a position sensor of the identified manned loading machine, a destination position for the operator to get on the sprinkling vehicle, in a vicinity of the manned loading machine;

identify, based on the position data, a sprinkling vehicle to be caused to travel to the destination position, among a plurality of the sprinkling vehicles performing a sprinkling work at the work site based on the sprinkling data;

output a transport command such that the identified sprinkling vehicle switches from a sprinkling mode to a transport mode and travels to the destination position in an unmanned manner;

cause the sprinkling vehicle to travel based on an operation of a start switch provided in the sprinkling vehicle after the operator gets on the sprinkling vehicle;

transmit, after receiving a getting-off notification indicating that the operator has gotten off the sprinkling vehicle, a cancellation command to the sprinkling vehicle to cancel the transport mode; and control the sprinkling vehicle to transition from the transport mode to the sprinkling mode after receiving the cancellation command and to resume the sprinkling work based on the sprinkling data.

2. The management system according to claim 1, wherein the transport request includes a getting-on position at which the operator gets on the sprinkling vehicle.

3. The management system of a work site according to claim 2, wherein the transport request further includes a getting-off position at which the operator gets off the sprinkling vehicle.

4. The management system according to claim 2, wherein the destination position is the getting-on position set in a vicinity of the manned loading machine.

5. The management system according to claim 1, wherein the processor is configured to identify, among the plurality of sprinkling vehicles, a sprinkling vehicle existing at a position closest to the destination position as the sprinkling vehicle to be caused to travel to the destination position.

6. The management system according to claim 1, wherein each of the plurality of sprinkling vehicles has a tank that stores water, and the processor is configured to identify, among the plurality of sprinkling vehicles, a sprinkling vehicle having the smallest remaining amount of water stored in the tank as the sprinkling vehicle to be caused to travel to the destination position.

7. The management system according to claim 1, wherein the processor is configured to generate, when receiving the transport request, travel data in a transport work such that the identified sprinkling vehicle travels to the destination.

8. The management system according to claim 7, wherein the processor is configured to store a sprinkled area in which sprinkling has been performed and an unsprinkled area in which sprinkling has not been performed at the work site, based on a stored or past sprinkling time, and the processor is configured to generate the travel data in the transport work based on the sprinkled area and the unsprinkled area.

9. The management system according to claim 8, wherein the processor is configured to generate the travel data in the transport work such that the identified sprinkling vehicle travels while sprinkling water in the unsprinkled area.

10. The management system according to claim 1, wherein the sprinkling vehicle transitions from the transport mode to the sprinkling mode after receiving the cancellation command, and resumes the sprinkling work based on the sprinkling data from a traveling road in a vicinity of the destination position.

11. The management system according to claim 1, wherein the sprinkling vehicle has a human detection sensor configured to detect boarding of the operator in place of or in addition to the start switch, and the sprinkling vehicle travels after determining that the operator has gotten on the sprinkling vehicle based on the human detection sensor.

* * * * *